(No Model.)
W. E. WHITMAN.
WEEDER.
No. 555,142. Patented Feb. 25, 1896.
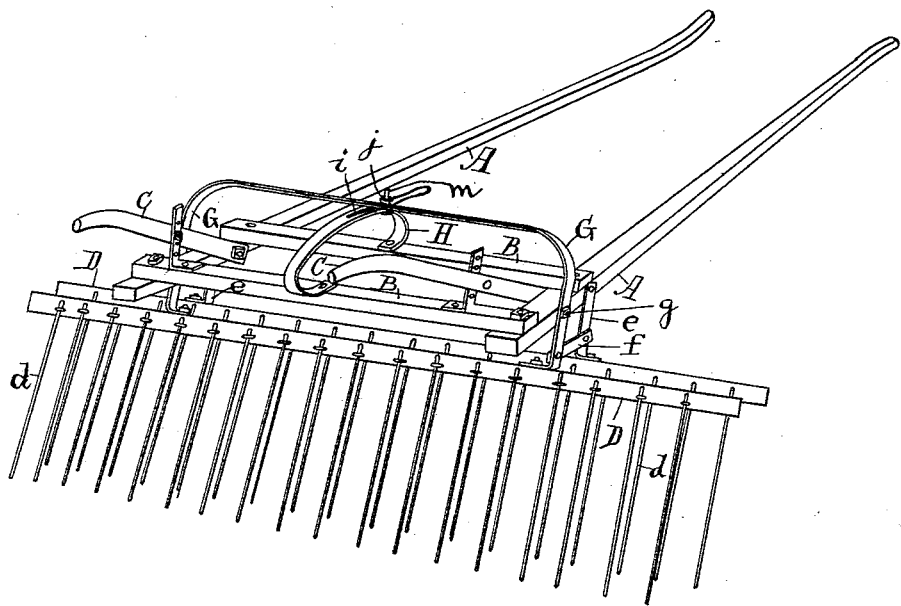
Witnesses:
E. Dudley Freeman
Bessie Winslow
Inventor:
William E. Whitman
by S. W. Bates
his Atty.

UNITED STATES PATENT OFFICE.

WILLIAM E. WHITMAN, OF AUBURN, MAINE.

WEEDER.

SPECIFICATION forming part of Letters Patent No. 555,142, dated February 25, 1896.

Application filed December 18, 1895. Serial No. 572,517. (No model.)

*To all whom it may concern:*

Be it known that I, WILLIAM E. WHITMAN, a citizen of the United States, and a resident of Auburn, in the county of Androscoggin and State of Maine, have invented a certain new and useful Improvement in Weeders; and I hereby declare that the following is a full, clear, and exact description of the same, such as will enable others skilled in the art to which said invention belongs to make and use the same.

My invention relates to that form of agricultural implement known as a "weeder," the same being used for destroying the weeds in growing crops.

The weeder to which my invention particularly applies consists of two parallel toothbars having spring-teeth which are to be drawn across the ground in an upright or inclined position. The tooth-bars are pivotally suspended from a pair of shafts by means of hangers and they are connected together by a link, so that they are kept always at the same relative inclination. It is important in this class of weeders to provide for changing the inclination of the tooth-bars according to the character of the ground over which the weeder is to be drawn.

Previous to my invention the tooth-bars were adjusted by a bar pivoted to one of the tooth-bars at each side of the shafts, each bar being adjustably connected with the outside of the shaft by a bolt passing through a slot in the bar. The difficulty with this adjusting device was that it was liable to slip, and as there were two independent members to be separately adjusted, one on each side, it required considerable time to make the adjustment.

According to my present invention I make use of an adjusting-lever in the form of an arch, the ends being secured to one of the tooth-bars outside of the shafts and extending above the shafts from side to side. It is secured in its several positions by being clamped to a circular segment in the center. As I prefer to construct the device the ends of the lever serve as hangers to suspend the rear bar from the shaft, the lever being pivoted to the outside of the shaft above the bar.

I illustrate my invention by means of the accompanying drawing, which represents a perspective view of a weeder of the class described having my adjusting device mounted thereon.

In the drawing, A A represent the two shafts, to the rear end of which the weeder is attached.

B B are the cross-bars.

C C are the handles, and D D are the tooth-bars pivotally suspended from the shafts by means of hangers.

*e e* are the hangers for the forward toothbar, and *f f* are the links connecting the two bars for preserving their parallel inclination. As herein shown the hanger for the rear tooth-bar is extended up and across in the form of an arch G, extending above the shafts from side to side. The ends of this arch-lever G are secured to the top of the rear tooth-bar on each side and it is pivoted to the outside of the shaft on each side by a bolt *g*. The upper portion of the lever extends across horizontally, as I prefer to make it, so that it can be readily grasped by the hand at any point. Provision is made for clamping the lever in any desired position in order to regulate the inclination of the spring-teeth *d*. This I accomplish by means of the circular segment H made, as here shown, of a flat bar bent to form a segment, so that the surface of the lever as it passes over it will be at all times in contact with it. The ends of the segment are secured to the cross-bars B.

In order to clamp the lever I provide a bolt *m*, which passes through the lever G and through a slot *i* in the segment H. This slot allows a certain amount of motion to the lever, sufficient to give the range of adjustments necessary for the teeth *d*. A handle-nut *j* screws onto the upper end of the bolt to clamp the lever in position.

From the description given of my implement it will be seen that it can be almost instantly adjusted by the operator walking behind by seizing the lever at any point, loosening the nut, and moving the lever to the desired position according to the inclination desired on the teeth. It will also be seen that the adjusting-lever performs the double function of acting as an adjusting device and as a hanger for pivoting the rear tooth-bar to the shafts. The clamping device being so high up holds the lever firmly, so that it does not slip.

I claim—

1. The herein-described weeder consisting of two connecting parallel tooth-bars having spring-teeth, a pair of shafts to which said bars are pivoted, an adjusting-lever, each end of which is connected with one of said bars at each side of said pair of shafts, the said lever forming an arch extending above said shafts from side to side, cross-bars on said shafts, a circular segment secured to said cross-bars and means for clamping said lever in various positions on said circular segment.

2. The herein-described weeder consisting of two connecting parallel tooth-bars having spring-teeth, a pair of shafts to which said bars are pivoted, an adjusting-lever, each end of which is connected with one of said bars at each side of said pair of shafts, the said lever forming an arch extending above said shafts from side to side, cross-bars on said shafts, a flat bar secured to said cross-bar and forming a circular segment, said bar having formed therein a longitudinal slot, a bolt passing through said slot and said lever and a nut on said bolt for clamping said lever.

3. The herein-described weeder consisting of two connecting parallel tooth-bars having spring-teeth, a pair of shafts for supporting said bars, hangers secured to the tops of said bars and pivoted to said shafts, the connecting rear hangers extending upward and above said shafts from side to side and forming an adjusting-lever and means for securing said adjusting-lever in any desired position.

In witness whereof I have hereunto set my hand in the presence of two witnesses.

WILLIAM E. WHITMAN.

Witnesses:
S. W. BATES,
J. R. LEARNED.